US012189117B2

(12) United States Patent
Mackey

(10) Patent No.: US 12,189,117 B2
(45) Date of Patent: Jan. 7, 2025

(54) SELF-CLEANING CAMERA LENS SYSTEM AND METHOD

(71) Applicant: Jeffrey Mackey, Toronto (CA)

(72) Inventor: Jeffrey Mackey, Toronto (CA)

( * ) Notice: Subject to any disclaimer, the term of this patent is extended or adjusted under 35 U.S.C. 154(b) by 473 days.

(21) Appl. No.: 17/569,652

(22) Filed: Jan. 6, 2022

(65) Prior Publication Data

US 2022/0221713 A1    Jul. 14, 2022

Related U.S. Application Data

(60) Provisional application No. 63/135,732, filed on Jan. 10, 2021.

(51) Int. Cl.
*G02B 27/00* (2006.01)
*H04N 23/55* (2023.01)

(52) U.S. Cl.
CPC ......... *G02B 27/0006* (2013.01); *H04N 23/55* (2023.01)

(58) Field of Classification Search
CPC ............................. G02B 27/0006; H04N 23/55
USPC ........................................................ 359/509
See application file for complete search history.

(56) References Cited

U.S. PATENT DOCUMENTS

| | | | |
|---|---|---|---|
| 9,774,768 B1* | 9/2017 | Wojdacki, Jr. | H04N 23/51 |
| 9,880,382 B1* | 1/2018 | Tippy | B60S 1/566 |
| 2002/0139394 A1* | 10/2002 | Bronson | G02B 27/0006 134/6 |
| 2012/0000024 A1* | 1/2012 | Layton | G03B 11/00 15/97.1 |
| 2014/0020201 A1* | 1/2014 | Bunt | B08B 1/16 15/250.31 |
| 2014/0036132 A1* | 2/2014 | Pawlowski | B60S 1/0411 348/335 |
| 2015/0246660 A1* | 9/2015 | Seedall | B60S 1/22 359/507 |
| 2021/0370844 A1* | 12/2021 | Hu | G02B 27/0006 |
| 2022/0234547 A1* | 7/2022 | Lee | B60S 1/52 |
| 2023/0145395 A1* | 5/2023 | Giraud | G02B 27/0006 701/36 |
| 2023/0333366 A1* | 10/2023 | Nabavi | G02B 1/14 |

* cited by examiner

*Primary Examiner* — Ricky D Shafer
(74) *Attorney, Agent, or Firm* — CAPEHART LAW FIRM

(57) ABSTRACT

A lens cleaning system is disclosed herein. The lens cleaning system includes a main case, a lens shield, an actuator means, a cleaning member housing, at least one cleaning member, and a power supply system. The lens cleaning system attaches to a camera to allow for longer shot durations without having the image obstructed by debris. The self-cleaning camera lens system may be particularly designed to be self-cleaning, self-contained, mobile, discrete, easy to use, easily attachable, unobtrusive and at least partially self-maintaining and self-powered.

19 Claims, 16 Drawing Sheets

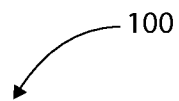
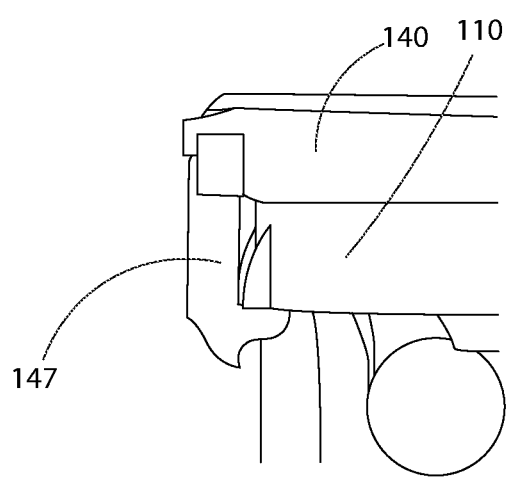
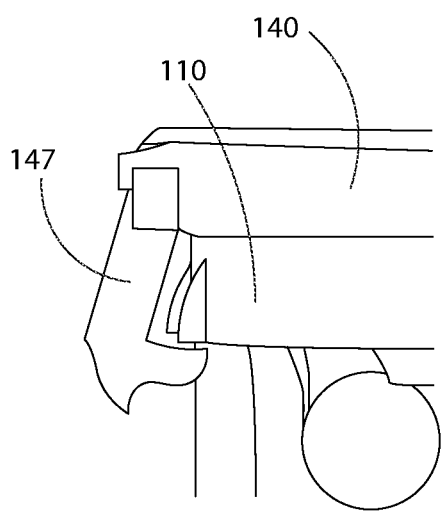
FIG. 7A  FIG. 7B

SELF-CLEANING CAMERA LENS SYSTEM AND METHOD

CROSS-REFERENCE TO RELATED APPLICATION

The present application is related to and claims priority to U.S. Provisional Patent Application No. 63/135,732 filed Jan. 10, 2021, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of camera cleaning devices of existing art and more specifically relates to a camera lens cleaning device.

RELATED ART

A digital camera is an optical instrument used to capture an image, or a motion image, utilizing lenses to focus light onto an image pickup device. A common problem with cameras is that the lens is easily soiled, and therefore the image or motion images captured with the camera are obstructed. This is particularly true for cameras that are immersed in action and/or located outdoors as they can be easily and quickly soiled by debris. With these types of cameras, it is also often difficult to clean the debris from the lens as they are located in difficult to reach or dangerous areas (such as mounted to a side of a moving vehicle) and thus, there is a very short amount of clear filming time.

Attempts have been made to solve this problem. However, these attempts have not been satisfactory as they are either bulky, not self-contained, do not continuously clean (and therefore the shot is already ruined before the device cleans the lens), do not have long battery life, require a large amount of cleaning fluid, or utilize a cleaning means that crosses in front of the lens, thereby ruining the shot. Thus, a suitable solution is desired.

SUMMARY OF THE INVENTION

In view of the foregoing disadvantages inherent in the known camera cleaning device art, the present disclosure provides a novel self-cleaning camera lens system. The general purpose of the present disclosure, which will be described subsequently in greater detail, is to effectively provide unobstructed footage for a prolonged period and maintain image quality in debris-filled filming environments.

A lens cleaning system is disclosed herein. The lens cleaning system is configured for attachment to a camera and for automatically cleaning a lens thereof, the lens including an optical axis defining a light path. The lens cleaning system may include a main case, a lens shield, an actuator means, a cleaning member housing, at least one cleaning member, and a power supply system for supplying power to the lens cleaning system. The main case may include an attachment means configured to attach the lens cleaning system to the camera; a bottom section; a top section sat atop the bottom section; and a shield housing disposed within the top section. The shield housing may include a lens aperture in which the lens sits when the lens cleaning system is attached to the camera. The lens aperture may be sized at least substantially equal to the lens of the camera such that the lens is not obstructed.

The lens shield may be seated within the shield housing. The lens shield may be seated atop the lens when the lens cleaning system is attached to the camera. The lens shield may be transparent such that the light path passes through the lens shield unobscured. The actuator means may be attached to the lens shield such that the actuator means is able to rotate the lens shield relative to the optical axis.

The cleaning member housing may be removably attached atop the lens shield. The cleaning member housing may include a left side and a right side relative to the camera. The left side may include a housing opening sized at least substantially equal to the lens of the camera such that the lens is not obstructed. The cleaning member housing may include at least one debris director means and at least one debris outlet. The at least one cleaning member may be seated within an interior side of the cleaning member housing and may be configured to contact a top surface of the lens shield and clean debris therefrom.

According to another embodiment, a method of automatically cleaning a lens of a camera is also disclosed herein. The method includes providing the lens cleaning system as above; attaching the cleaning member housing to the main case; attaching the main case to the camera via the attachment means; supplying power to the lens cleaning system, thereby: powering the actuator means; and causing the actuator means to continuously rotate the lens shield relative to the optical axis, the lens shield continuously passing by the at least one cleaning member such that said debris is continuously cleaned from the lens shield prior to passing over the lens of the camera and therefore the lens is always substantially free from the debris.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a self-cleaning camera lens system and method, constructed and operative according to the teachings of the present disclosure.

FIG. 7A is a side view of a flexible clip being closed and attaching a cleaning member housing to a main case, according to an embodiment of the present disclosure.

FIG. 7B is a side view of the flexible of FIG. 7A being open, according to an embodiment of the present disclosure.

The various embodiments of the present invention will hereinafter be described in conjunction with the appended drawings, wherein like designations denote like elements.

DETAILED DESCRIPTION

Figure 1:
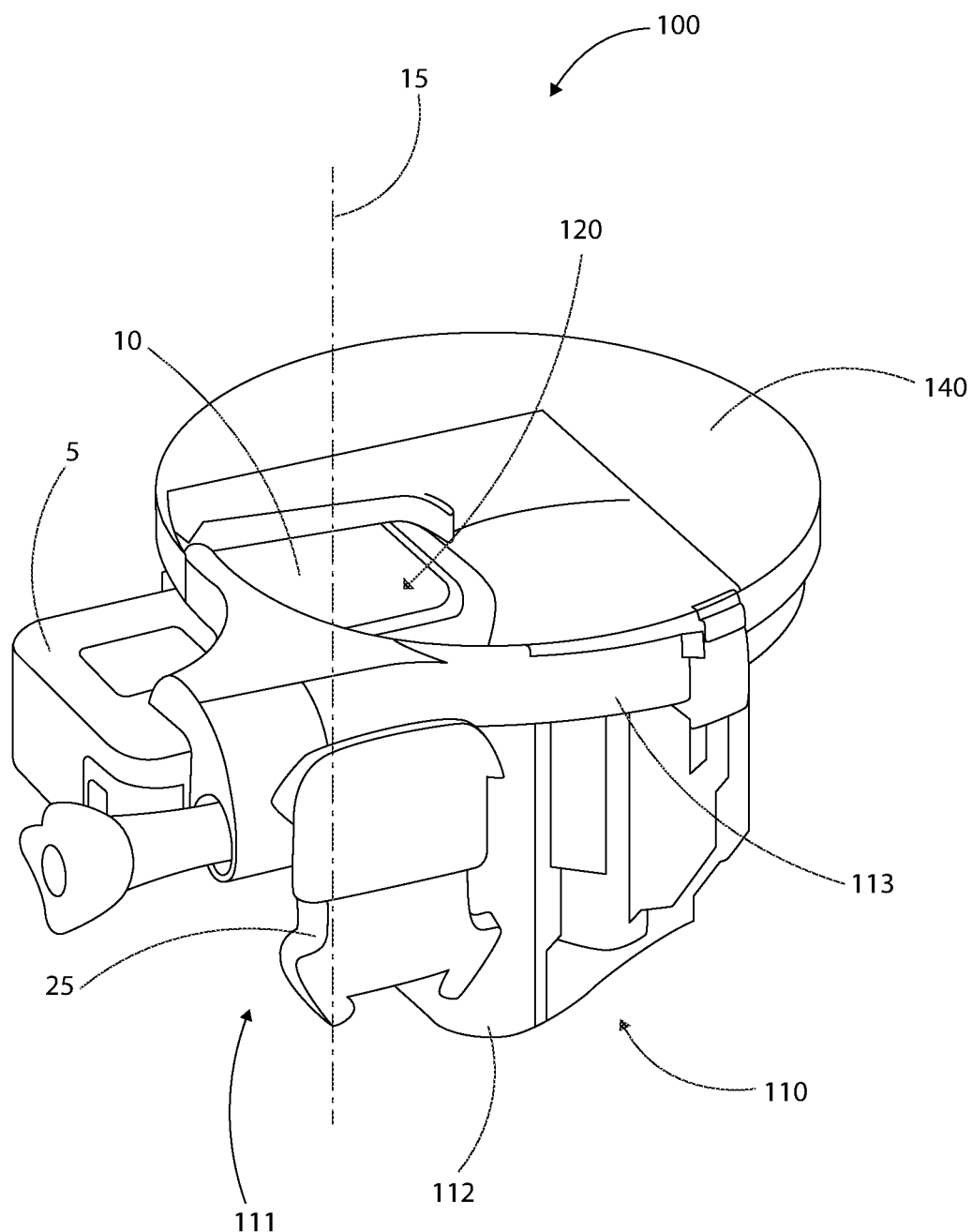
FIG. 1 is a side perspective view of a lens cleaning system attached to a camera according to an embodiment of the disclosure.

As discussed above, embodiments of the present disclosure relate to camera cleaning devices and more particularly to a self-cleaning camera lens system as used to provide a continuous cleaning system for camera lenses to allow for longer shot durations without having the image obstructed by debris. The self-cleaning camera lens system may be particularly designed to be self-cleaning, self-contained, mobile, discrete, easy to use, easily attachable, unobtrusive and at least partially self-maintaining and self-powered. Generally, the self-cleaning camera lens system may be small and compact such that a user can "grab it and go", and such that setting up the camera with the self-cleaning camera lens system attached may be as simple as if it were not attached. The self-cleaning camera lens system may be configured to clean both dry and liquid debris.

Referring now more specifically to the drawings by numerals of reference, there is shown in FIGS. 1-15, various views of a lens cleaning system 100. As shown, the lens cleaning system 100 may include a main case 110, a lens shield 120, an actuator means 130, a cleaning member housing 140, at least one cleaning member 150 and a power supply system 160. As shown in these figures, the lens cleaning system 100 may be configured for attachment to a camera 5. The lens cleaning system 100 may automatically and continuously (when powered on) clean a lens 10 of the camera 5. The lens 10 may include an optical axis 15 defining a light path. In some examples, the camera 5 may be a camera used in harsh conditions, hard to reach locations and/or other situations which a consistently clean lens 10 is desired and/or is difficult to clean manually. For instance, the camera 5 may be an action camera.

Figure 2:
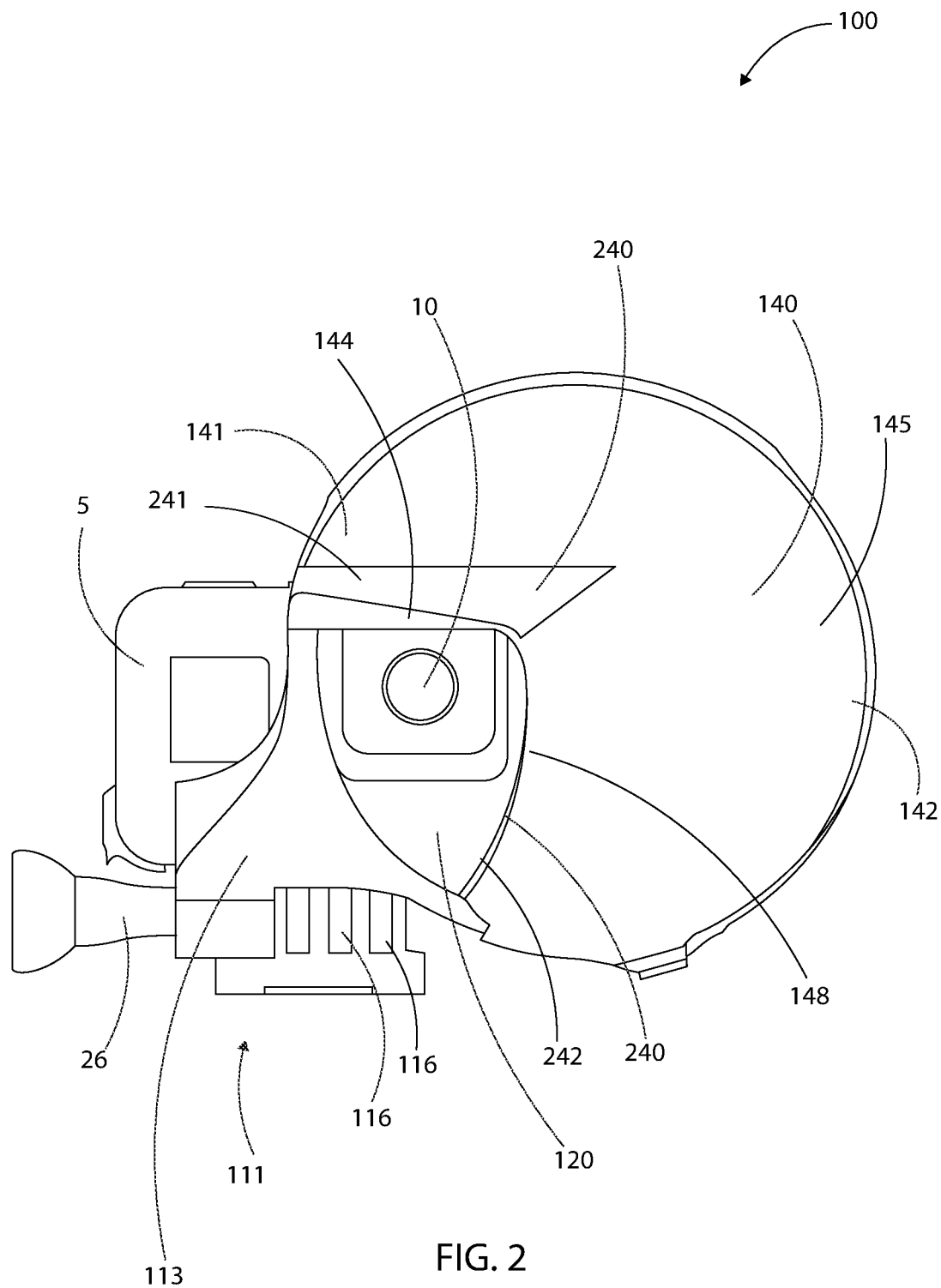
FIG. 2 is a front view of the lens cleaning system attached to the camera, according to an embodiment of the present disclosure.
Figure 3:
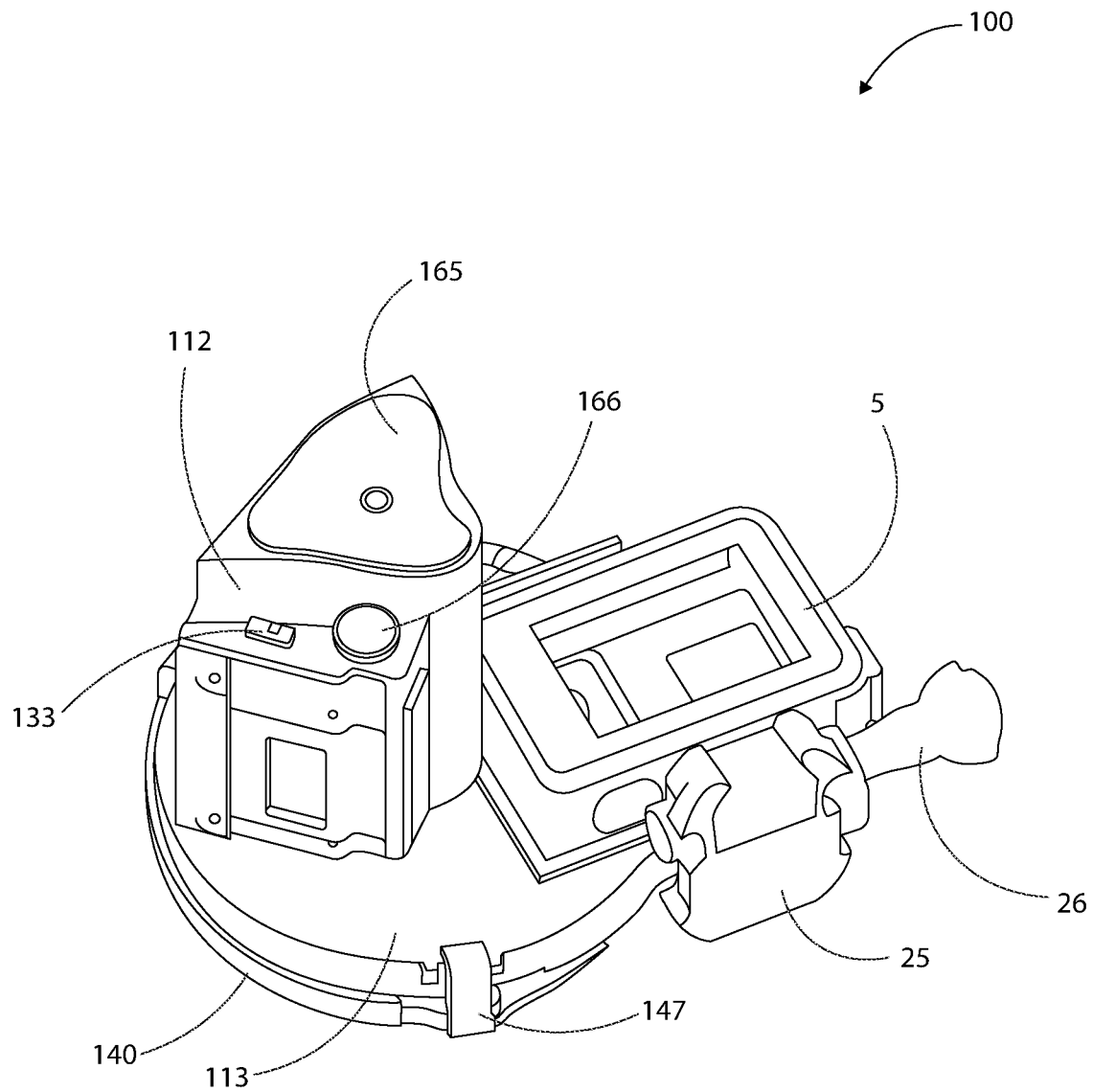
FIG. 3 is a bottom perspective view of the lens cleaning system attached to the camera, according to an embodiment of the present disclosure.
Figure 4:
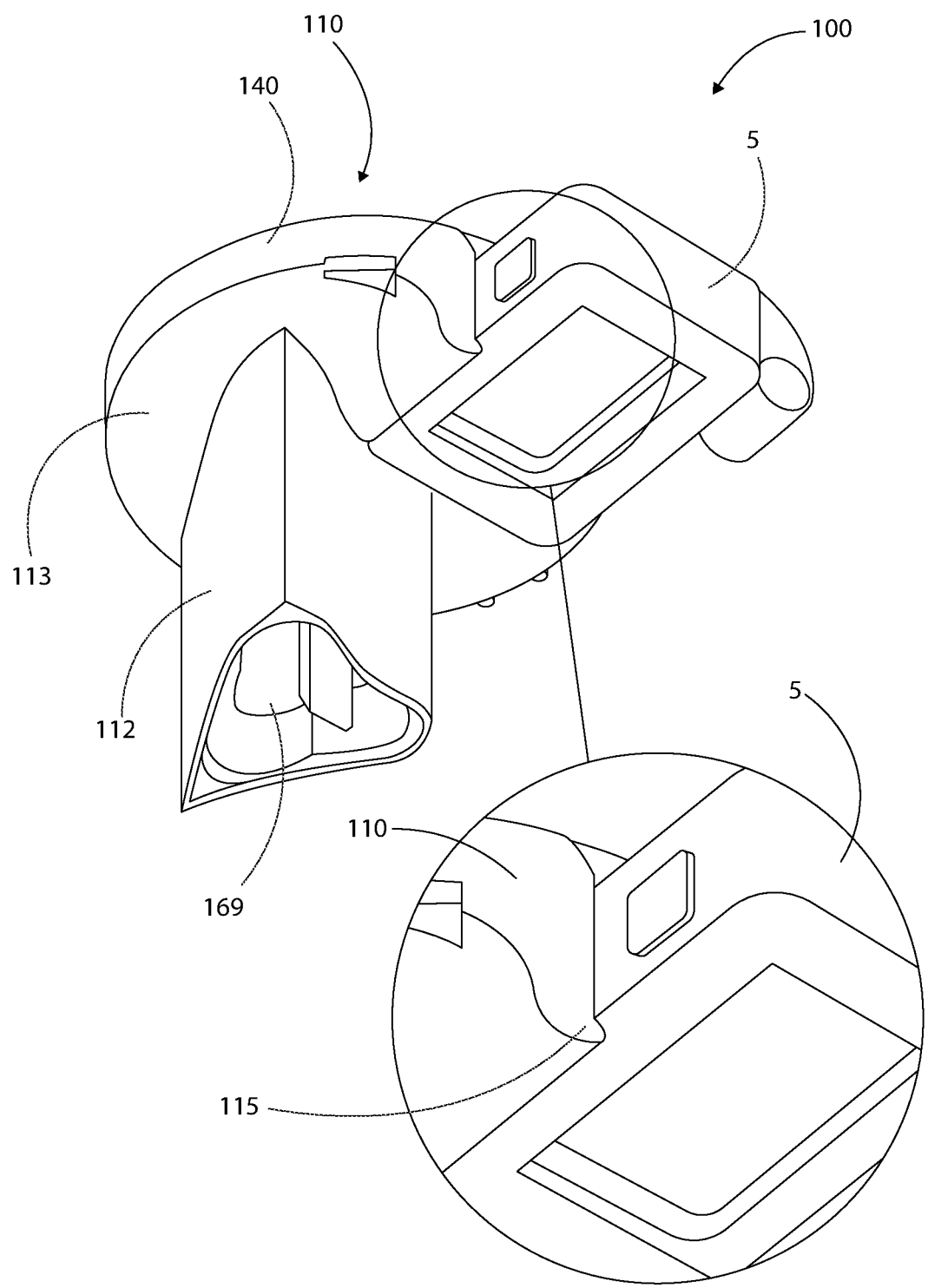
FIG. 4 is a bottom perspective view of the lens cleaning system attached to the camera and including a camera conforming clip, according to an embodiment of the present disclosure.

As shown in FIGS. 1-4, the main case 110 may include an attachment means 111 configured to attach the lens cleaning system 100 to the camera 5. As shown in FIG. 4, in some embodiments, the attachment means 111 may include a camera 5 conforming clip 115 configured to secure the camera 5 to the main case 110. Further, as shown in FIG. 2, the attachment means 111 may include brackets 116 configured to attach the main case 110 to existing mounting hardware 25 on the camera 5. In this embodiment, a nut and bolt combination 26 may be inserted through the brackets 116 and existing mounting hardware 25 to secure the main case 110 to the camera 5.

The main case 110 may further include a bottom section 112, a top section 113 sat atop the bottom section 112, and a shield housing 117 (FIG. 5) disposed within the top section 113. Preferably, the main case 110 may be tailored specifically to accommodate the camera 5 and ensure a secure connection for safety and mount-ability. In addition, in some embodiments, the main case 110 may include an angular shape. The angular shape may be configured to direct falling debris away from the lens cleaning system 100 (and therefore the lens 10).

Figure 5:
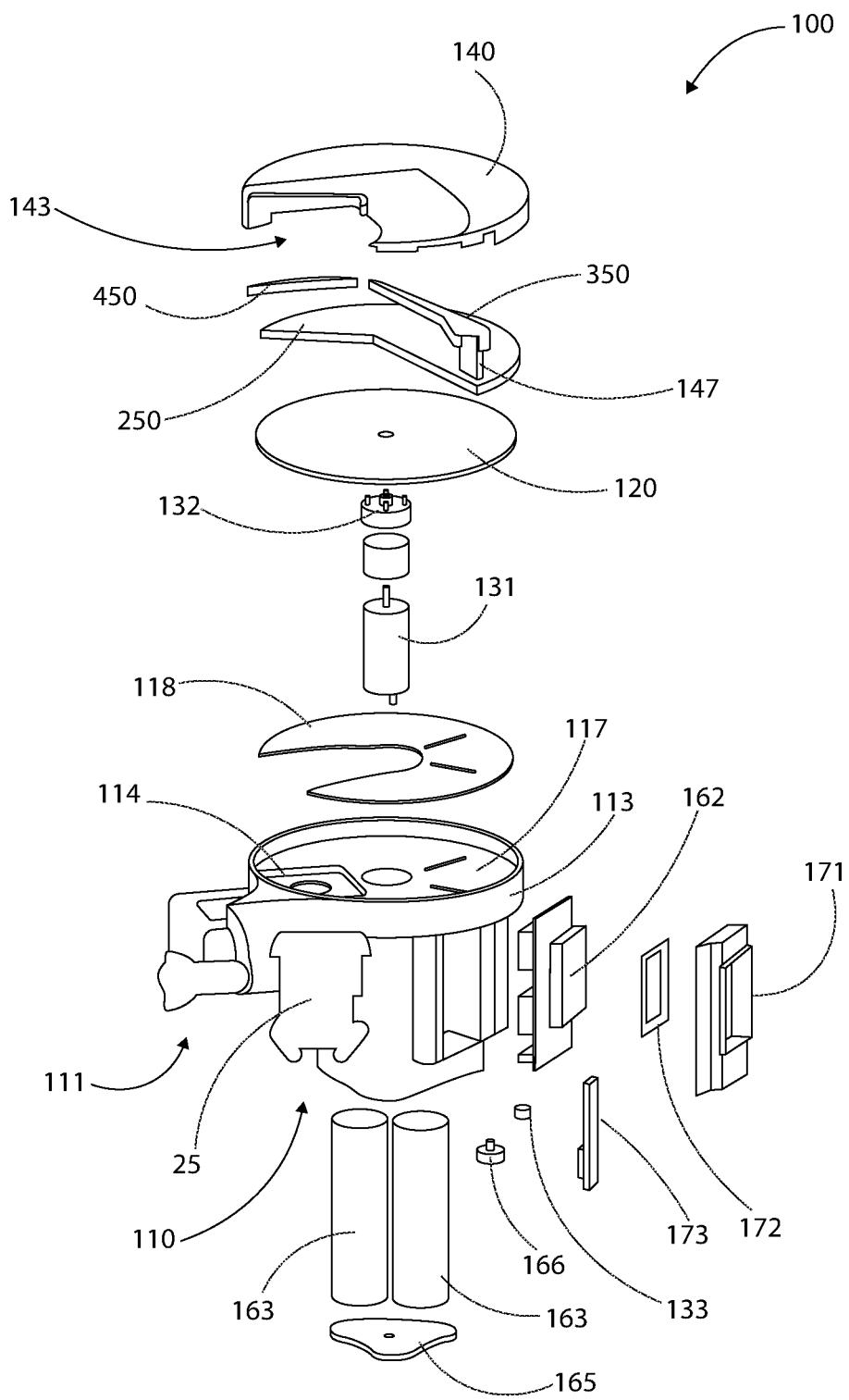
FIG. 5 is an exploded view of the lens cleaning system, according to an embodiment of the disclosure.

As shown in FIG. 5 particularly, the shield housing may include a lens aperture 114 in which the lens 10 sits when the lens cleaning system 100 is attached to the camera 5. As shown, the lens aperture 114 may be sized at least substantially equal to the lens 10 of the camera 5 such that the lens 10 is not obstructed and normal use of the lens 10 remains. The lens shield 120 may be seated within the shield housing 117. The lens shield 120 may be seated atop the lens 10 when the lens cleaning system 100 is attached to the camera 5 and configured to shield the lens 10 from debris, preventing damage thereto. In some embodiments as shown in FIG. 5, a dirt trap layer 118 may be included in the lens cleaning system 100 and located between the main case 110 and the lens shield 120. The dirt trap layer 118 may keep a rear surface of the lens shield 120 clean and hold it in place. The dirt trap layer 118 may further act as a filter to allow the lens shield 120 to sit flush with the lens 10 (and therefore provide improved protection).

Figure 6:
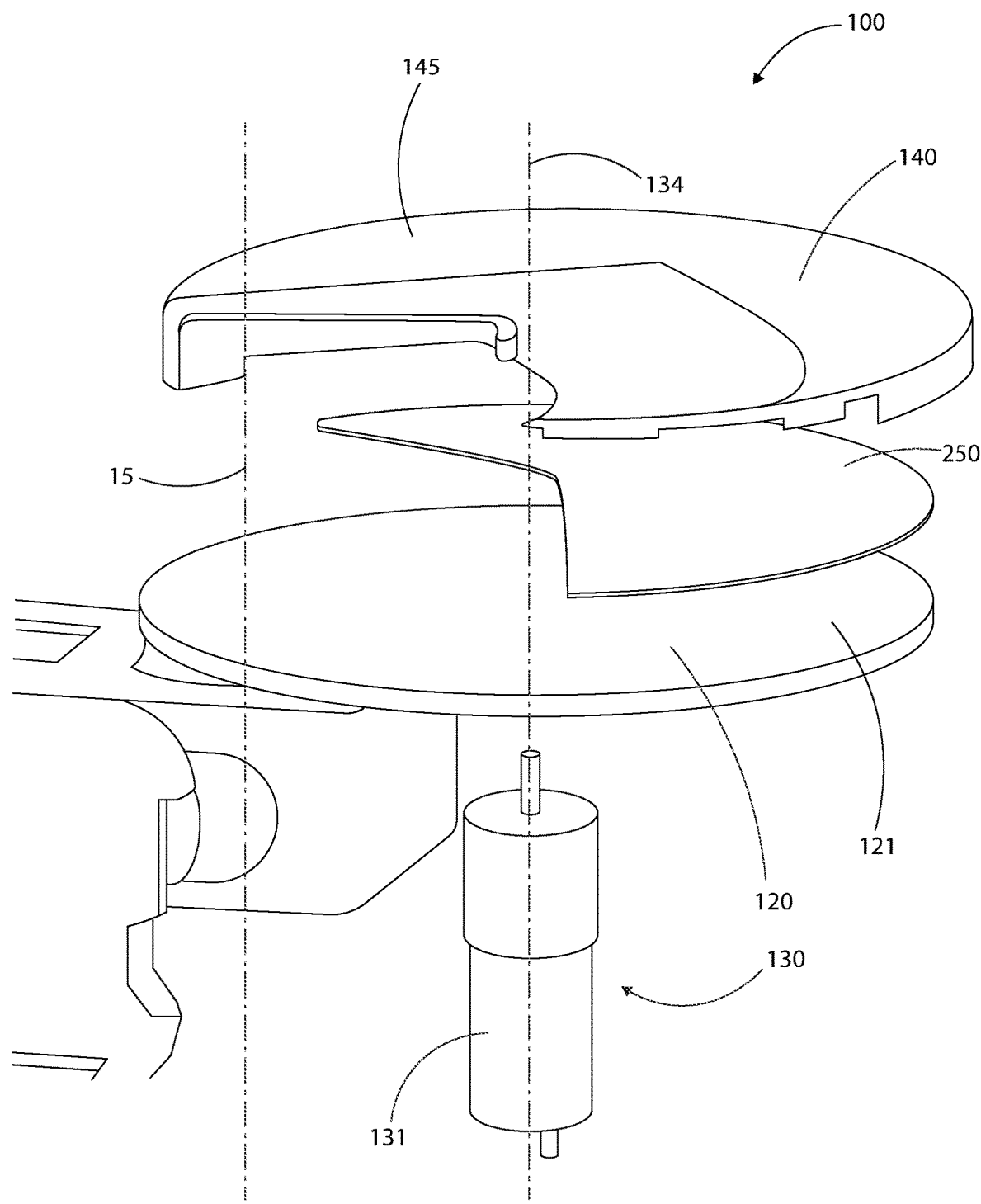
FIG. 6 is an exploded view of the lens cleaning system including the cleaning member housing, a cleaning wipe, a lens shield and a motor, and according to an embodiment of the present disclosure.

The lens shield 120 is transparent such that the light path passes through the lens shield 120 unobscured (and thus the camera 5 is able to take videos and photos as normal). As shown As shown in FIGS. 5-6 particularly, the lens shield 120 may include a disc shape. The lens shield 120 may be made from a glass or acrylic material and may include a scratch resistant and water repellent coating. Further, similar to the main case 110, the lens shield 120 may also include an angular design configured to redirect falling debris, and/or allow the lens shield 120 to be at least partially aerodynamic. It is imagined that the lens shield 120 may cover an entirety of the lens 10 so as to completely protect the lens 10 and allow the entirety of the lens 10 to be cleaned (as shown in FIG. 2). Preferably, a half of the lens shield 120 (as measured by a radius thereof) may cover an entire diameter of the lens 10. In some embodiments, the lens shield 120 may be tailored to fit the specific lens 10, thereby providing a formed, secure fit.

As shown in FIG. 6, the actuator means 130 may be attached to the lens shield 120 such that the actuator means 130 is able to rotate the lens shield 120 relative to the optical axis 15. Particularly, as shown, the actuator means 130 may include an actuator axis 134 about which the lens shield 120 rotates that is parallel to the optical axis 15. Preferably, as shown, the actuator means 130 may include a motor 131. The motor 131 may be speed adjustable such that a user may adjust a speed of the motor 131 depending on desired effect. To attach the motor 131 to the lens shield 120, in some embodiments, the lens shield 120 may include four apertures equally spaced around a center point thereof. A motor bit 132 or a "D-HUB" may be provided that is attached to a tip of the motor 131 (FIG. 5). The motor bit 132 may be lined up with the apertures on the lens shield 120 and fastened thereto (such as via screws). This attachment may evenly distribute torque of the motor 131 to four areas (the four apertures) of the lens shield 120, thereby preventing the lens shield 120 from cracking. In some embodiments, the lens cleaning system 100 may include a motor switch 133 (FIG. 3, FIG. 5 and FIG. 14) for selectively powering the motor 131 on and off.

The cleaning member housing 140 may be removably attached atop the lens shield 120. This may allow for easy removal and replacement of components located below the cleaning member housing 140 (discussed in more detail below). To facilitate easy removal of the top section 113 from the main case 110, preferably, as shown in FIGS. 7A-7B, the cleaning member housing 140 may include a pair of flexible clips 147. The flexible clips 147 may allow for back-and-forth flexibility thereof. Further, a groove located on the pair of flexible clips 147 may be angled to provide a better grip. The cleaning member housing 140 may include a left side 141 and a right side 142 relative to the camera 5 (FIG. 2). The left side 141 may include a housing opening 143 (FIG. 5) sized at least substantially equal to the lens 10 of the camera 5 so that the lens 10 is not obstructed. The cleaning member housing 140 may include at least one debris director means 240 and at least one debris outlet 340

Figure 8:
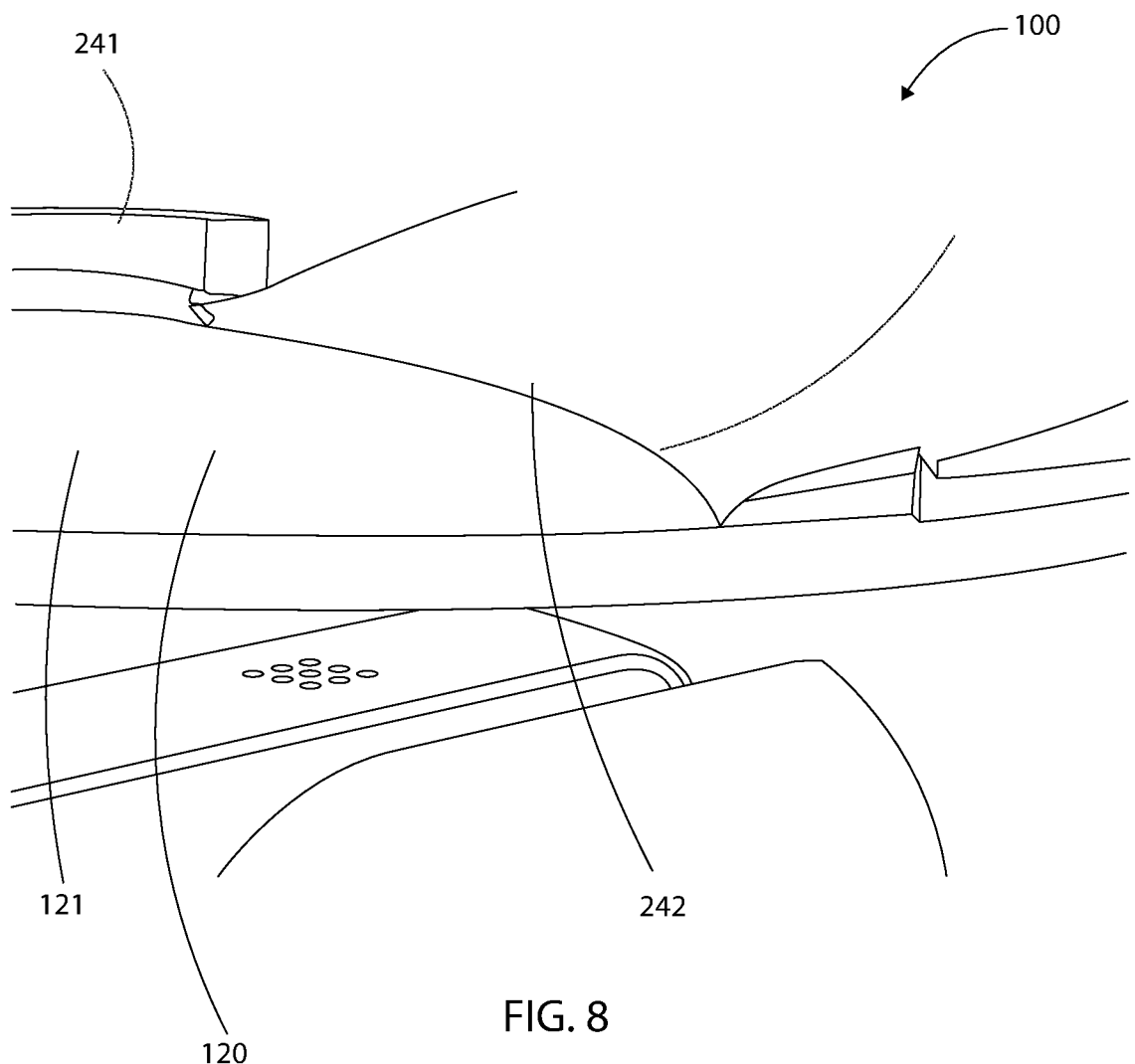
FIG. 8 is a close-up view of a blade located on the cleaning member housing, according to an embodiment of the disclosure.
Figure 9:
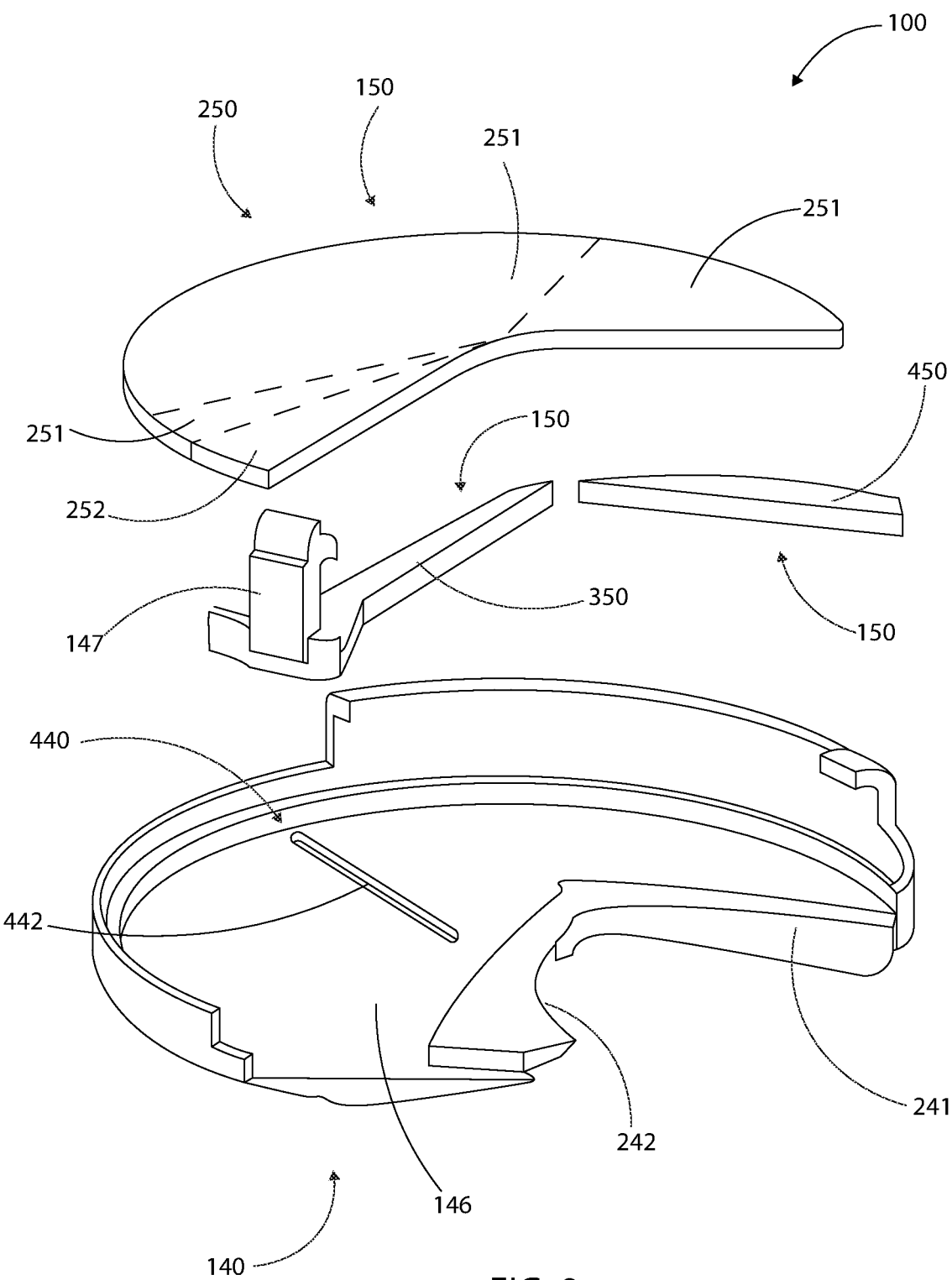
FIG. 9 is an exploded view of the lens cleaning system including the cleaning wipe, a main squeegee, a second squeegee and the cleaning member housing, according to an embodiment of the present disclosure.
Figure 10:
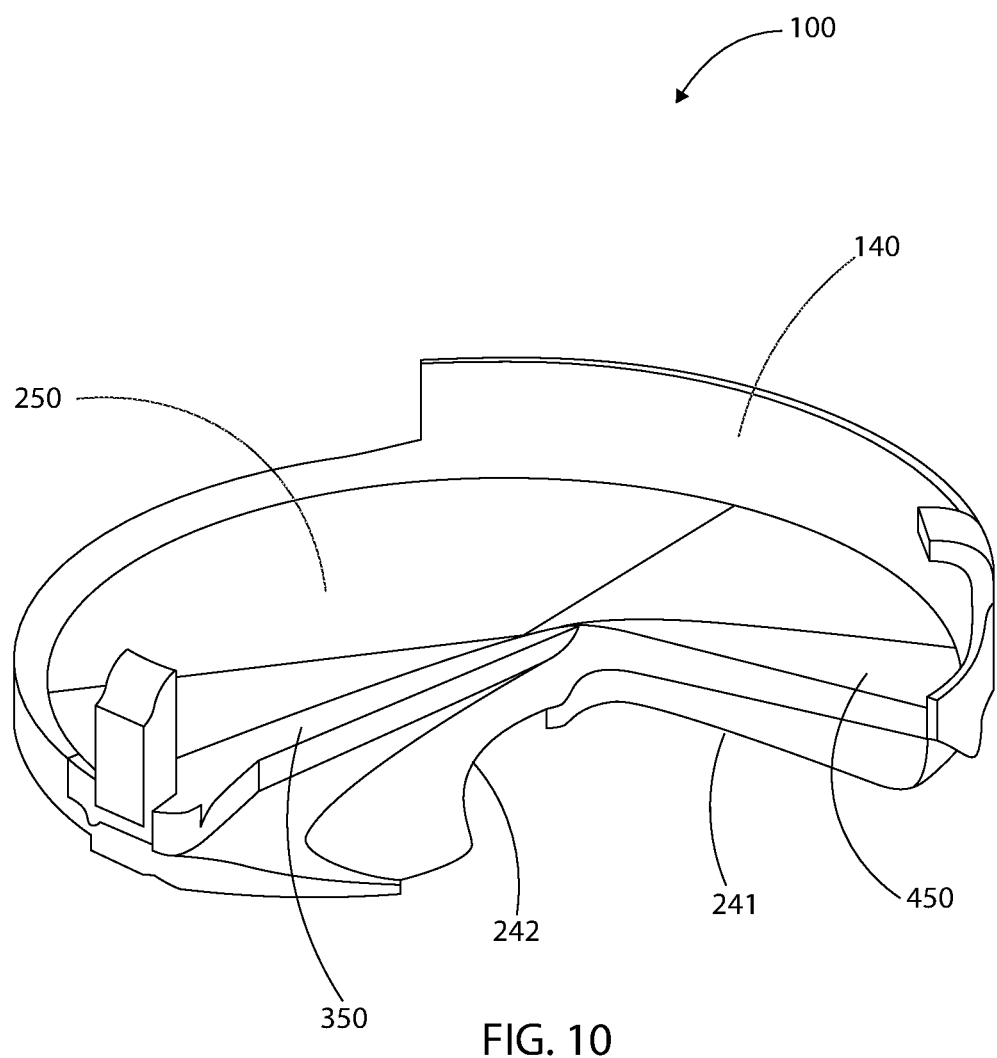
FIG. 10 is a perspective view of the lens cleaning system of FIG. 9 assembled, according to an embodiment of the present disclosure.

As shown in FIGS. 8-10, in some embodiments, the at least one debris director means 240 may include a raised lip 241 (or an 'eyebrow) located at a top exterior edge 144 of the housing opening 143 at an exterior side 145 of the cleaning member housing 140 (FIG. 2). The raised lip 241 may be positioned at a top of the lens 10 when the lens cleaning system 100 is attached to the camera 5 and configured to direct debris away from the lens 10. For example, the raised lip 241 may direct liquid debris, such as rain, snow, ice, etc. away from the lens 10. A position of the raised lip 241 relative to the lens 10 may also ensure that whilst the lens shield 120 is spinning, a cleaned section thereof will be protected right until it passes over the lens 10. This may ensure a substantially continuously clear shot, even with debris bombarding the lens 10. Further, the cleaning member housing 140 may include an angular shape to redirect debris (particularly liquid debris) from crossing in front of the lens 10.

In addition, as shown in FIGS. 8-10 and FIG. 12, the at least one debris director means 240 may further include a blade 242 located on a side edge 148 of the housing opening 143 at the exterior side 145 of the cleaning member housing 140 (FIG. 2). The blade 242 may be positioned at a side of the lens 10 when the lens cleaning system 100 is attached to the camera 5 and configured to scrape the debris from the lens shield 120. For example, the blade 242 may be particularly useful in scraping solid debris, large debris, and/or debris particularly difficult to remove. Friction between the blade 242 and the lens shield 120 may cause a scraping effect, dislodging heavy or large debris from the lens shield 120. In some embodiments, the blade 242 may include a hook-like shape with a sharp edge and a wavy exterior. This shape may aid in dislodging heavy or large debris from the lens shield 120 and directing that debris away from the lens shield 120. The blade 242 may preferably be pressed against the lens shield 120 when the cleaning member housing 140 is attached to the main case 110). When the lens shield 120 spins, debris may be directed to towards the blade 242.

The at least one cleaning member 150 may be seated within an interior side 146 of the cleaning member housing 140. The at least one cleaning member 150 may be confined to a covered area of the cleaning member housing 140; particularly, the at least one cleaning member 150 may not extend past the housing opening 143 so as to not obstruct the lens 10. As shown, the covered area may be a majority area of the cleaning member housing 140. As such, after the lens shield 120 has rotated a full 360 degrees, a once soiled section of the lens shield 120 is free (or at least one substantially free) from debris.

The at least one cleaning member 150 may be configured to contact a top surface 121 of the lens shield 120 and clean debris therefrom. The cleaning member housing 140 may fit tightly and securely over the lens shield 120 to ensure maximum efficiency of at least one cleaning member 150 on the lens shield 120 as the increased pressure of the tight fit ensures maximum surface contact. A precise amount of pressure may be applied to ensure maximum effect whilst preventing strain or damage to the motor 131. The pair of flexible clips 147 may be used provide the precise amount of pressure. For example, a height of the flexible clips 147 may be precise as they may dictate amount of pressure imposed on the lens shield 120, ensuring the motor 131 is not damaged.

As above, the cleaning member housing 140 may be removably attached to the main case 110. As such, components such as the dirt trap layer 118, the at least one cleaning member 150, the lens shield 120, etc. may be removed and replaced. For example, a user may remove the cleaning member housing 140 from the main case 110 to expose the at least one cleaning member 150; remove and replace the at least one cleaning member 150; unscrew the lens shield 120 from the motor bit 132; remove and replace the lens shield 120; and remove and replace the dirt trap layer 118.

Figure 11:
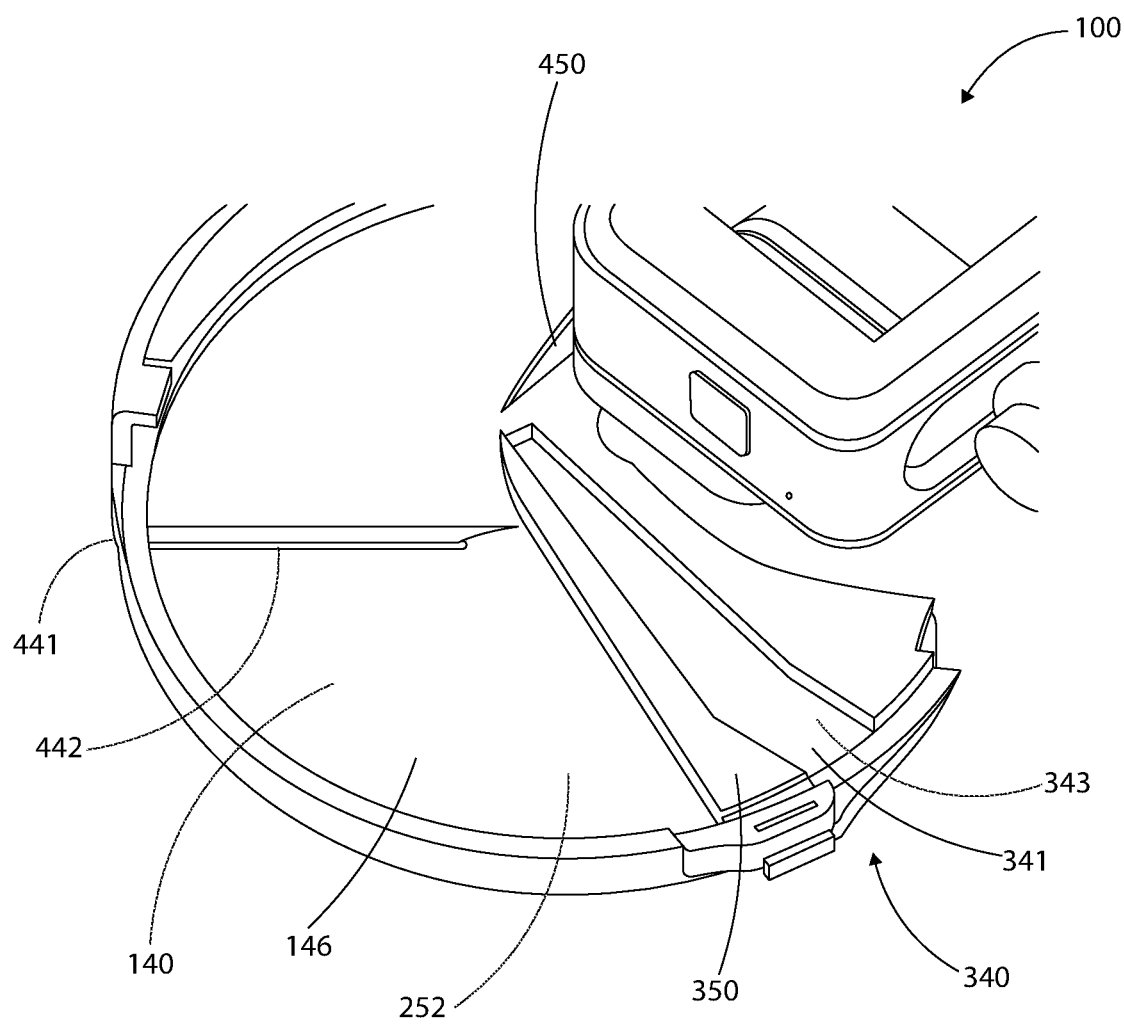
FIG. 11 is a top perspective view of the lens cleaning system illustrating an inlet aperture, an inlet tunnel, a drainage tunnel and a debris passageway, according to an embodiment of the present disclosure.

Whilst the lens shield 120 spins, it may go through a plurality of cleaning stages to ensure the view of the lens 10 remains substantially clear. As such, as shown in FIGS. 9-11 particularly, the at least one cleaning member 150 may include more than one cleaning member 150. For example, as shown in FIGS. 9-10 specifically, the at least one cleaning member 150 may include a cleaning wipe 250. As above, a half of the lens shield 120 may cover the entire diameter of the camera lens 10. The cleaning wipe 250 may cover (at least) an opposite half of the lens shield 120. The cleaning wipe 250 may be stationery and located in a dedicated groove on the cleaning member housing 140. The cleaning wipe 250 may continuously clean the half of the lens shield 120 that is not covering the lens 10 (as the lens shield 120 spins the half covering the lens 10 continuously changes).

The cleaning wipe 250 may be abrasive, efficient and highly absorbent. Further, the cleaning wipe 250 may also be configured to trap direct particles as well as absorb liquid. In some embodiments, the cleaning wipe 250 may include superabsorbent gel polymers configured to absorb moisture over a long period of time. As shown in FIG. 9 via dotted lines, the cleaning wipe 250 may be split into a plurality of sections 251. Each of the plurality of sections 251 may perform a different cleaning purpose. As such, the cleaning wipe may include a variety of textures and each section may include a different texture. For example, the cleaning wipe 250 may include a moisture stage, an abrasive stage, an absorbent stage, and a polishing and/or drying stage.

The moisture stage will be discussed in more detail below. The abrasive stage may include the loosening of stuck particles from the lens shield 120, this may involve the cleaning wipe 250 including a section with a course texture. The absorbent stage may include the absorbing of moisture, as well as trapping particles dislodged from the lens shield 120. The polishing and/or drying stage may wipe away any remaining liquid to dry the lens shield 120.

Further, as shown in FIGS. 9-13, the at least one cleaning member 150 may further include a main squeegee 350 (a scraper device). The main squeegee 350 may be located behind the blade 242 (as shown in FIG. 10) and configured to remove the debris from the lens shield 120. Particularly, the main squeegee 350 may be configured to dispel liquid as well as smaller debris that passed by the blade 242. For example, as the lens shield 120 spins, it may push debris and liquid towards the blade 242 which dislodges heavier debris, and smaller debris or liquid debris is then directed towards the main squeegee 350. A seal between the lens shield 120 and the main squeegee 350 may allow the main squeegee 350 to wick away liquid from the surface of the lens shield 120 and redirect its flow.

Figure 12:
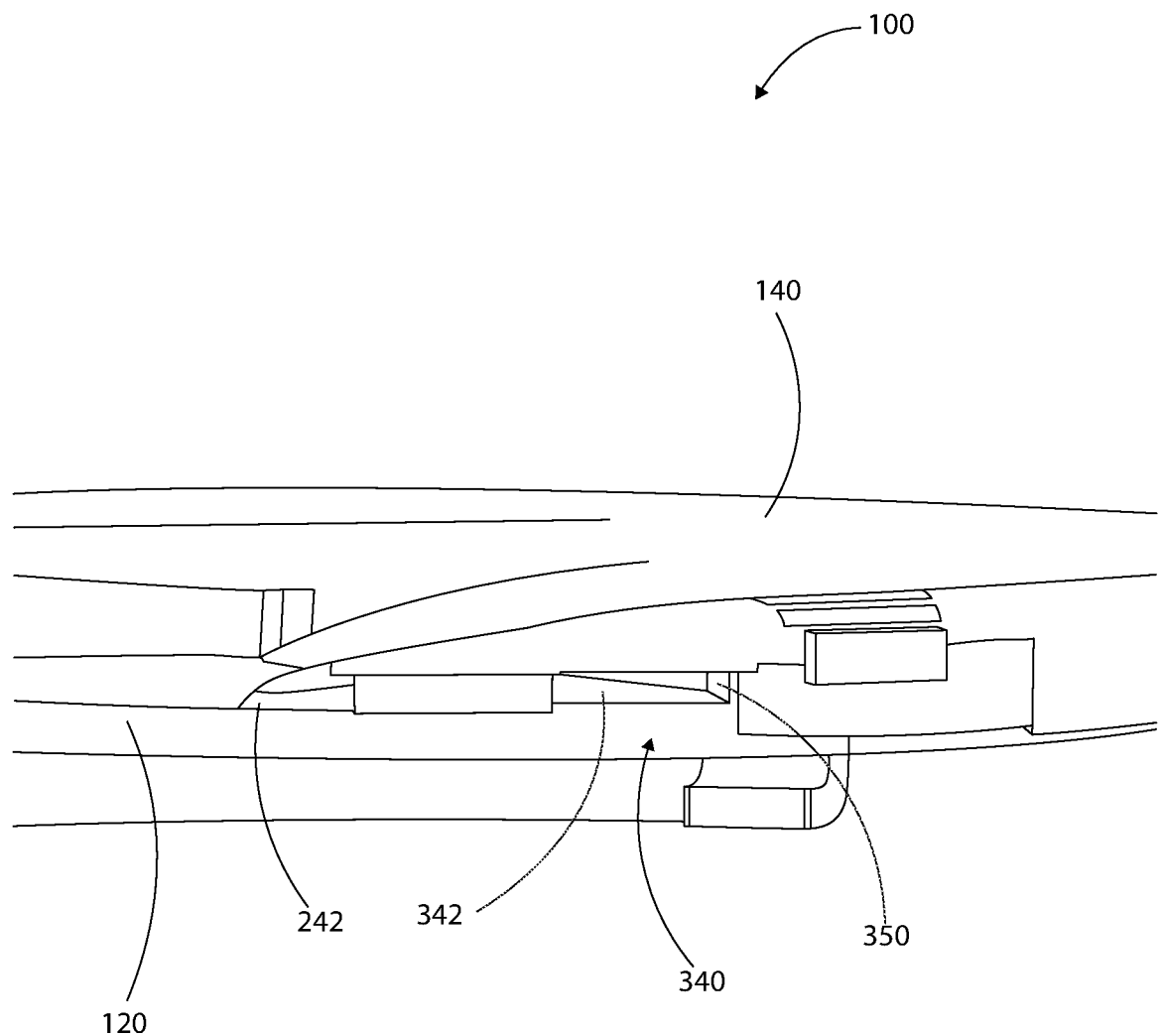
FIG. 12 is a close-up view of the lens cleaning system of a drainage aperture, according to an embodiment of the present disclosure.

As shown in FIGS. 11-12, the at least one debris outlet 340 may include a drainage tunnel 341 and a drainage aperture 342 located on the interior side 146 of the cleaning member housing 140. In some examples, the drainage tunnel 341 may be a groove cut into the cleaning member housing 140. In this embodiment, the debris removed by the main squeegee 350 may be directed through the drainage tunnel 341 and out through the drainage aperture 342.

Further, in some embodiments, as shown in FIGS. 9-11 and FIG. 13, the at least one cleaning member 150 may further include a second squeegee 450 located behind the raised lip 241 (FIG. 10) and configured to remove remaining debris from the lens shield 120. The second squeegee 450 may be useful in a final stage of cleaning. For example, before a previously soiled section of the lens shield 120 rotates back in front of the lens 10 (cleaned), the second squeegee 450 may redirect any remaining debris on the surface of the previously soiled section downwards and away. This may ensure that the previously soiled section is completely clean and transparent before it passes in front of the lens 10.

Figure 13:
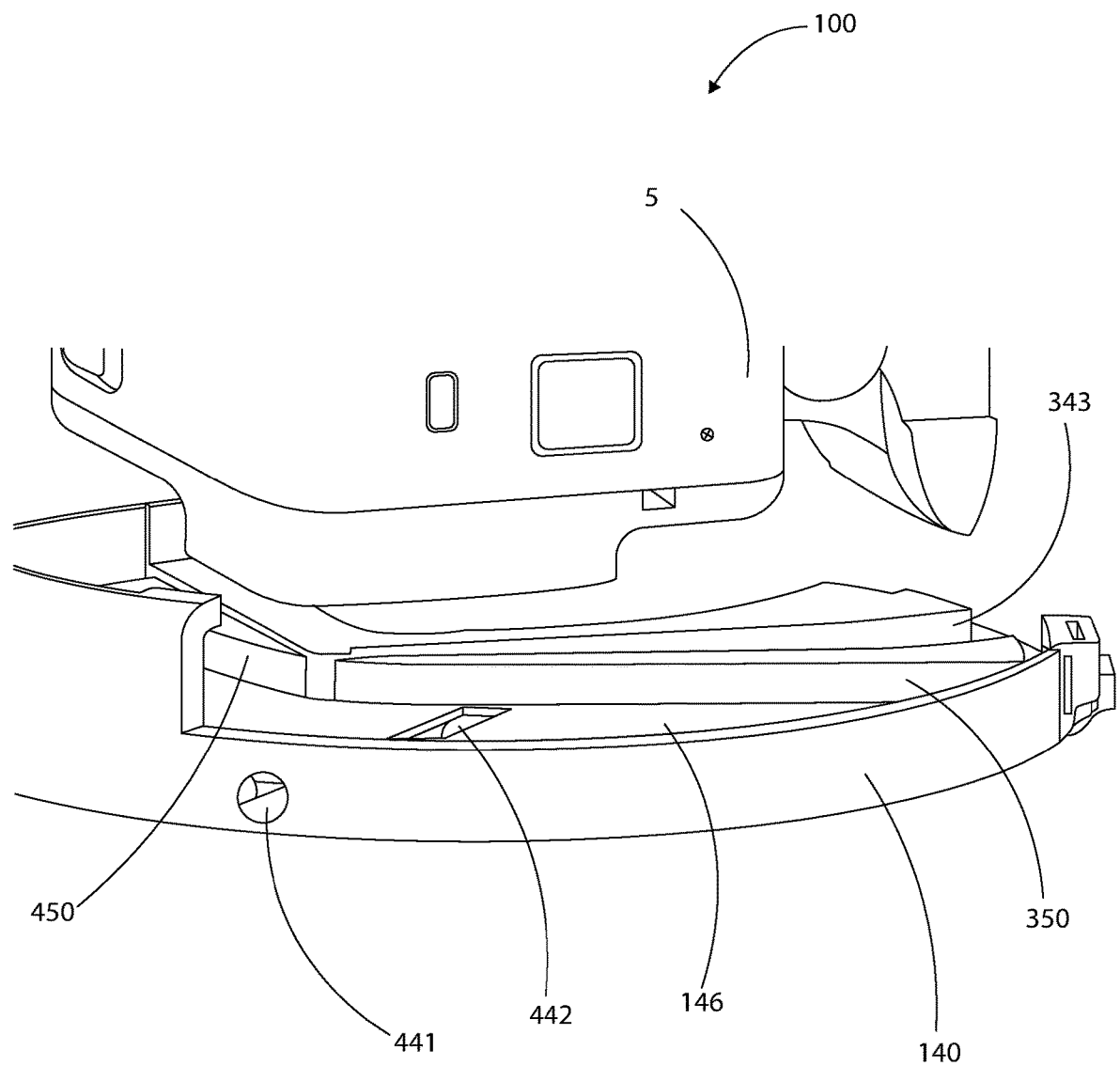
FIG. 13 is a close-up view of the lens cleaning system illustrating the inlet aperture and the inlet tunnel, according to an embodiment of the present disclosure.

As above, the cleaning wipe 250 may include a moisture stage. In this embodiment, the cleaning wipe 250 may include a wet area 252. As shown in FIG. 11 and FIG. 13, the cleaning member housing 140 may further include a liquid inlet 440. The liquid inlet 440 may include an inlet aperture 441 attached to an inlet tunnel 442 and may be configured to receive cleaning liquid. The cleaning liquid may be directed through the inlet tunnel 442 and into the wet area 252, and the lens shield 120 may be at least partially wetted by the wet area 252 during rotation of the lens shield 120. Thereby, the lens shield 120 may be at least partially cleaned by the cleaning liquid which may help dislodge larger and/or solid stuck on debris.

In addition to this, as shown in FIG. 11, the at least one debris director means 240 may further include a debris passageway 343 located on the interior side 146 of the cleaning member housing 140. In this embodiment, the second squeegee 450 may further be configured to remove remaining cleaning liquid from the lens shield 120 and the remaining cleaning liquid may be directed through the debris passageway 343 and into the wet area 252 for recirculation. In some embodiments, as shown in FIG. 11, the debris passageway 343 may be integral to the drainage tunnel 341. Recirculation may include steps such as: using a cleaning liquid in a distribution bottle with a small narrow tip; placing the tip of the bottle inside the liquid aperture; squirting a small amount of cleaning fluid into the inlet aperture 441; and ensuring the main case 110 and the cleaning member housing 140 is upright so that the cleaning liquid is able to follow through the inlet tunnel 442 to the wet area 252 where the cleaning liquid may be caught by the (rotating) lens shield 120 (and thus it is cleaned by the cleaning liquid).

Figure 14:
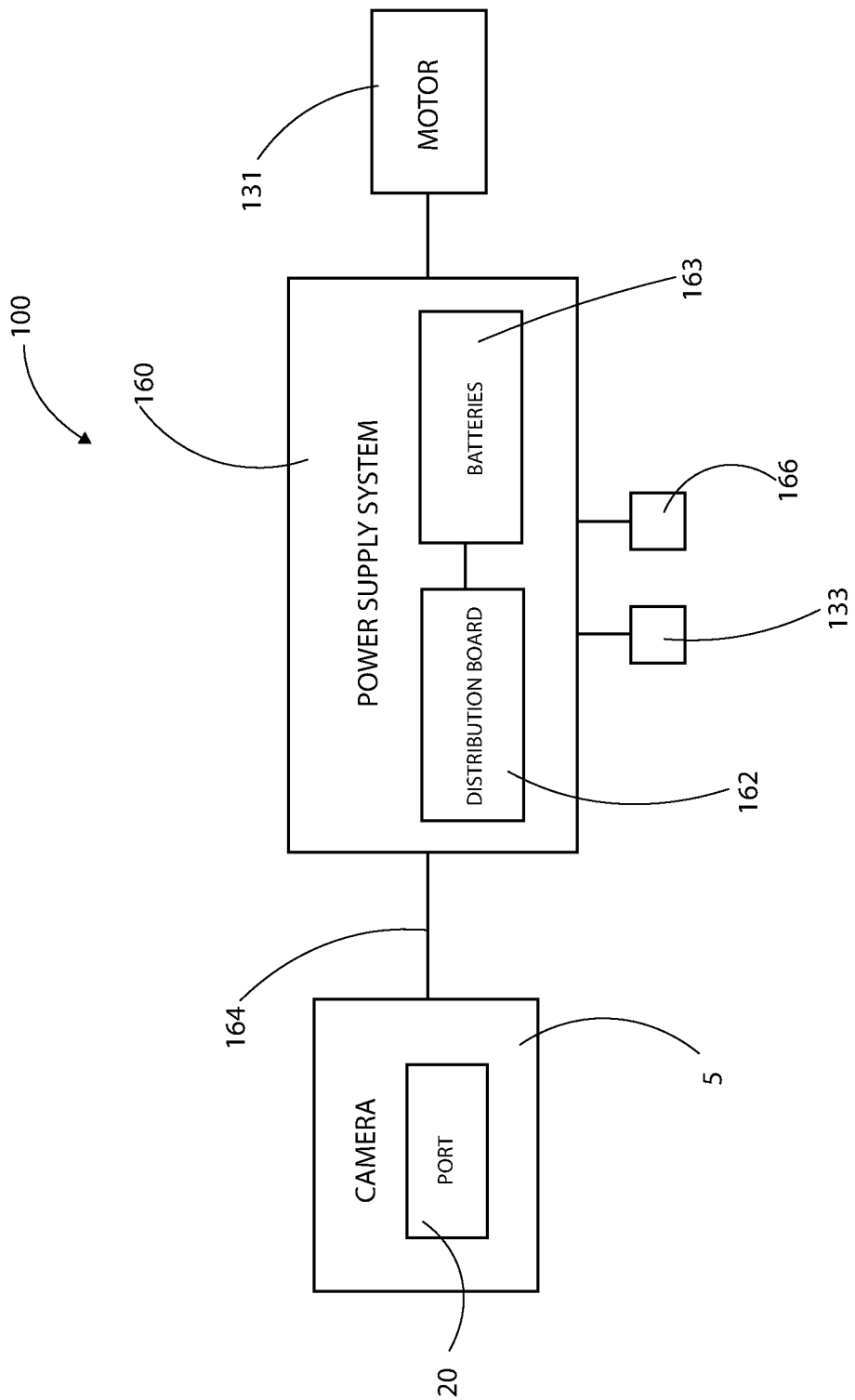
FIG. 14 is a schematic diagram of a power supply system, according to an embodiment of the present disclosure.

The power supply system 160 may be configured for supplying power to the lens cleaning system 100. Particularly, the power supply system 160 may supply power to the actuator means 130. As shown in FIG. 14, the power supply system 160 may preferably include batteries 163. The batteries 163 may be stored within the bottom section 112 of the main case 110 (FIG. 5). Particularly, the batteries 163 may be placed into a slot 169 (FIG. 4) in the main case 110 and closed with a battery door 165 (FIG. 5) to ensure debris does not contact the batteries 163. Further, the power supply system 160 may include the motor switch 133 for controlling power to the motor 232 (and selectively switching the motor 131 on and off) and a power switch 166 for controlling power to the lens cleaning system 100.

Further, as shown in FIG. 14 (and FIG. 5) the power supply system 160 may include a distribution board 162. The distribution board 162 may include a power input for allowing for charging of the batteries 163. Applying continuous power into the power input may allow for charging of the batteries 163, as well as powering of the actuator means 130 without reliance on the batteries 163. The distribution board 162 may also be able to control the actuator means 130 automatically through other means, such as a remote device. Further, the distribution board 162 may be able to provide more or less power through its power outputs or provide a variation of power outputs such as amperage, voltage, or number of outputs and inputs. To ensure that the distribution board 162 does not contact debris, a screen protector 171 (FIG. 5) may be installed for covering the distribution board 162. Further, as shown in FIG. 5, to ensure the distribution board 162 remains sealed, in some embodiments, a gasket 172 may be provided.

Figure 15:
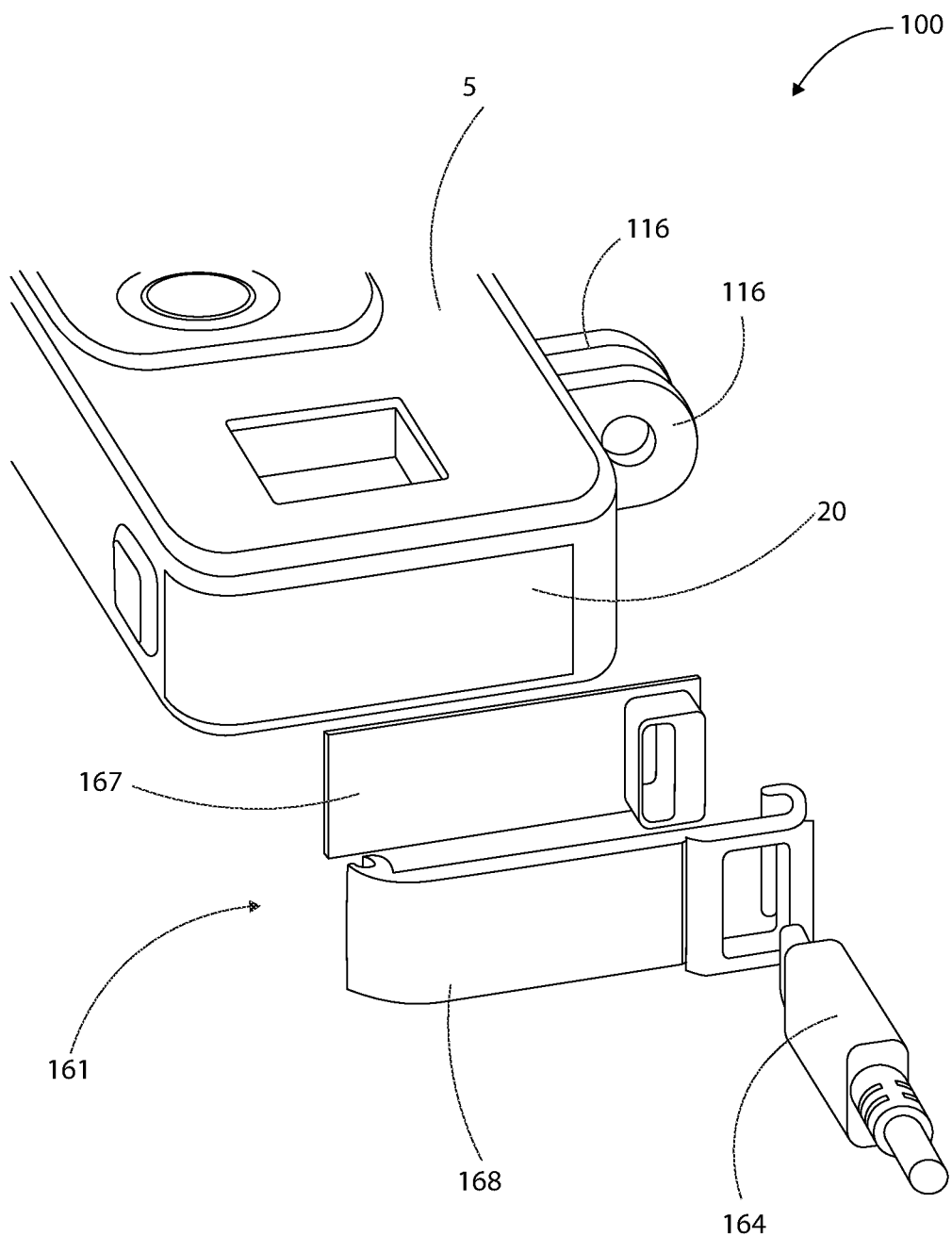
FIG. 15 is a perspective view of the camera, a seal element and a power extension cord, according to an embodiment of the present disclosure.

In addition to this, a power extension cord 164 may be provided, as shown in FIGS. 14-15. The power extension cord 164 may be configured to plug into the camera 5, extending a battery life of the camera 5. A seal element 161 may be provided and configured for attachment about a power input port 20 of the camera 5. The seal element 161 may be a replacement part for the camera's 5 original clip for its power input port 20. The seal element 161 may be configured to prevent debris and debris from entering the power input port 20 and therefore, the seal element 161 may provide a tight seal between a male power connector (of the power extension cord 164) and the seal element 161, therefore providing a "splash-proof" connection. The seal element 161 may be custom made for each type of camera 5 used with the lens cleaning system 100. As shown, the seal element 161 may include a specialty clip 167 and rubber seal 168. Further, in some embodiments, the power supply system 160 may include a Universal Serial Bus (USB) plug 173 (FIG. 5).

In some embodiments, power extension cord 164 may also be configured to power the self-cleaning lens 10 system using an alternative source of energy, such as a larger battery, a DC power outlet, a solar panel, etc. Further, in some embodiments, the lens 10 cleaning may include an integral alternative power source such as a battery bank or solar panel. In addition, in some embodiments, the lens cleaning system 100 may include a processing unit.

Figure 16:
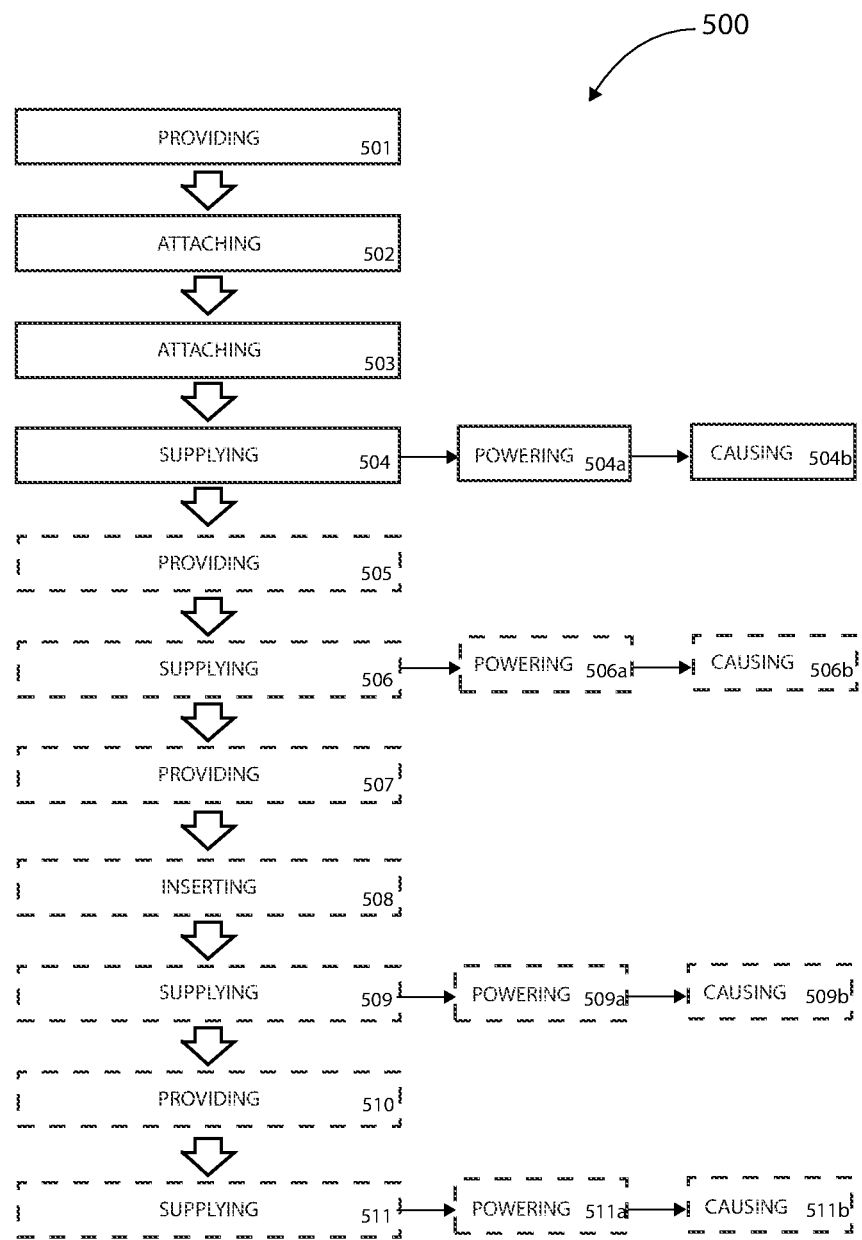
FIG. 16 is a flow diagram illustrating a method of automatically cleaning a lens of a camera, according to an embodiment of the present disclosure.

Referring now to FIG. 16 showing a flow diagram illustrating a method 500 of automatically cleaning a lens of a camera, according to an embodiment of the present disclosure. In particular, the method 500 may include one or more components or features of the lens cleaning system 100 as described above. As illustrated, the method 500 may include the steps of: step one 501, providing the lens cleaning system as above; step two 502, attaching the cleaning member housing to the main case; step three 503, attaching the main case to the camera via the attachment means; and step four 504, supplying power to the lens cleaning system, thereby: powering 504*a* the actuator means; and causing 504*b* the actuator means to continuously rotate the lens shield relative to the optical axis, the lens shield continuously passing by the at least one cleaning member such that said debris is continuously cleaned from the lens shield prior to passing over the lens of the camera and therefore the lens is always substantially free from said debris.

Further steps may include step five 505, again providing the lens cleaning system as above (including the raised lip, the blade, the drainage tunnel, the drainage aperture, the cleaning wipe, the main squeegee and the second squeegee); and step six 506, supplying power to the lens cleaning system, thereby: powering 506*a* the actuator means; and causing 506*b* the actuator means to continuously rotate the lens shield relative to the optical axis, the lens shield continuously passing by the main squeegee, the cleaning wipe, the second squeegee and the blade, the main squeegee removing said debris from the lens shield, the blade scraping said debris from the lens shield, the cleaning wipe cleaning said debris from the lens shield and the second squeegee removing said remaining debris from the lens shield prior to the lens shield passing over the lens, the raised lip directing said debris away from lens, said debris removed by the main squeegee directed through the drainage tunnel and out through the drainage aperture.

Further steps may include step 507, again providing the lens cleaning system as above (including the wet area, the debris passageway, the liquid inlet with liquid aperture and liquid tunnel); step 508, inserting cleaning liquid into the liquid inlet, the cleaning liquid directed through the inlet tunnel and into the wet area; and step nine 509 supplying power to the lens cleaning system, thereby: powering 509*a* the actuator means; and causing 509*b* the actuator means to continuously rotate the lens shield relative to the optical axis, the lens shield being at least partially wetted by the wet area during rotation of the lens shield and thereby the lens shield is at least partially cleaned by the cleaning liquid.

Additional steps may include step ten 510, again providing the lens cleaning system as above (wherein the second squeegee is configured to remove remaining cleaning liquid from the lens shield); and step eleven 511, supplying power to the lens cleaning system, thereby: powering 511*a* the actuator means; and causing 511*b* the actuator means to continuously rotate the lens shield relative to the optical axis, the lens shield continuously passing by the main squeegee, the cleaning wipe, the second squeegee and the blade, the second squeegee removing remaining cleaning liquid from the lens shield, the remaining cleaning liquid being directed through the debris passageway and into the wet area for recirculation.

It should be noted that certain steps are optional steps and may not be implemented in all cases. Optional steps of method 500 are illustrated using dotted lines in FIG. 16 so as to distinguish them from the other steps of method 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for automatically cleaning a lens of a camera are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A lens cleaning system for attachment to a camera and for automatically cleaning a lens thereof, the lens including an optical axis defining a light path, the lens cleaning system comprising:
   a main case including an attachment means configured to attach the lens cleaning system to the camera, a bottom section, a top section sat atop the bottom section, and a shield housing disposed within the top section, the shield housing including a lens aperture in which the lens sits when the lens cleaning system is attached to the camera, the lens aperture sized at least substantially equal to the lens of the camera such that the lens is not obstructed;
   a lens shield seated within the shield housing, the lens shield seated atop the lens when the lens cleaning system is attached to the camera, the lens shield being transparent such that the light path passes through the lens shield unobscured;
   an actuator means attached to the lens shield such that the actuator means is able to rotate the lens shield relative to the optical axis;
   a cleaning member housing removably attached atop the lens shield, the cleaning member housing including a left side and a right side relative to the camera, the left side including a housing opening sized at least substantially equal to the lens of the camera such that the lens is not obstructed, the cleaning member housing including at least one debris director means and at least one debris outlet;

at least one cleaning member seated within an interior side of the cleaning member housing, the at least one cleaning member configured to contact a top surface of the lens shield and clean debris therefrom; and a power supply system for supplying power to the lens cleaning system, wherein the at least one debris director means includes a raised lip located at a top exterior edge of the housing opening at an exterior side of the cleaning member housing, the raised lip being positioned at a top of the lens when the lens cleaning system is attached to the camera, and wherein the raised lip is configured to direct said debris away from the lens.

2. The lens cleaning system of claim 1, wherein the at least one debris director means further includes a blade located on a side edge of the housing opening at the exterior side of the cleaning member housing, the blade being positioned at a side of the lens when the lens cleaning system is attached to the camera, and wherein the blade is configured to scrape said debris from the lens shield.

3. The lens cleaning system of claim 2, wherein the at least one cleaning member includes a cleaning wipe.

4. The lens cleaning system of claim 3, wherein the cleaning wipe is split into a plurality of sections, and wherein each of the plurality of sections performs a different cleaning purpose.

5. The lens cleaning system of claim 4, wherein one of the plurality of sections includes a wet area.

6. The lens cleaning system of claim 5, wherein the at least one cleaning member further includes a main squeegee located behind the blade, and wherein the main squeegee is configured to remove said debris from the lens shield.

7. The lens cleaning system of claim 6, wherein the at least one debris outlet includes a drainage tunnel and a drainage aperture located on the interior side of the cleaning member housing.

8. The lens cleaning system of claim 7, wherein said debris removed by the main squeegee is directed trough the drainage tunnel and out through the drainage aperture.

9. The lens cleaning system of claim 8, wherein the at least one cleaning member further includes a second squeegee located behind the raised lip, and wherein the second squeegee is configured to remove remaining debris from the lens shield.

10. The lens cleaning system of claim 9, wherein the cleaning member housing further includes a liquid inlet, wherein the liquid inlet includes an inlet aperture attached to an inlet tunnel, wherein the liquid inlet is configured to receive cleaning liquid, wherein the cleaning liquid is directed through the inlet tunnel and into the wet area, and wherein the lens shield is at least partially wetted by the wet area during rotation of the lens shield and thereby the lens shield is at least partially cleaned by the cleaning liquid.

11. The lens cleaning system of claim 10, wherein the at least one debris outlet further includes a debris passageway located on the interior side of the cleaning member housing, and wherein the second squeegee is further configured to remove remaining cleaning liquid from the lens shield, and wherein the remaining cleaning liquid is directed through the debris passageway and into the wet area for recirculation.

12. The lens cleaning system of claim 1, further comprising a seal element configured for attachment about a power input port of the camera, and wherein the seal element is configured to prevent debris and debris from entering the power input port.

13. The lens cleaning system of claim 1, wherein the cleaning member housing includes a pair of flexible clips configured to removably attach the cleaning member housing to the main case.

14. The lens cleaning system of claim 1, wherein the attachment means includes a camera conforming clip configured to secure the camera to the main case.

15. A lens cleaning system for attachment to a camera and for automatically cleaning a lens thereof, the lens including an optical axis defining a light path, the lens cleaning system comprising:

a main case including an attachment means configured to attach the lens cleaning system to the camera, a bottom section, a top section sat atop the bottom section, and a shield housing disposed within the top section, the shield housing including a lens aperture in which the lens sits when the lens cleaning system is attached to the camera, the lens aperture sized at least substantially equal to the lens of the camera such that the lens is not obstructed, the attachment means including a camera conforming clip configured to secure the camera to the main case;

a lens shield seated within the shield housing, the lens shield seated atop the lens when the lens cleaning system is attached to the camera, the lens shield being transparent such that the light path passes through the lens shield unobscured;

an actuator means attached to the lens shield such that the actuator means is able to rotate the lens shield relative to the optical axis;

a cleaning member housing removably attached atop the lens shield, the cleaning member housing including a left side and a right side relative to the camera, the left side including a housing opening sized at least substantially equal to the lens of the camera such that the lens is not obstructed, the cleaning member housing including a pair of flexible clips, a raised lip, a blade, a drainage aperture, a drainage tunnel, a debris passageway and a liquid inlet, the pair of flexible clips configured to removably attach the cleaning member housing to the main case, the raised lip located at a top exterior edge of the housing opening at an exterior side of the cleaning member housing and positioned at a top of the lens when the lens cleaning system is attached to the camera, and wherein the raised lip is configured to direct said debris away from the lens, the blade located on a side edge of the housing opening at the exterior side of the cleaning member housing and positioned at a side of the lens when the lens cleaning system is attached to the camera, and wherein the blade is configured to scrape said debris from the lens shield, the drainage tunnel and the drainage aperture located on the interior side of the cleaning member housing, the debris passageway located on the interior side of the cleaning member housing, the liquid inlet including an inlet aperture attached to an inlet tunnel, the liquid inlet configured to receive cleaning liquid;

a cleaning wipe seated within an interior side of the cleaning member housing, the cleaning wipe configured to contact a top surface of the lens shield and clean debris therefrom, the cleaning wipe is split into a plurality of sections, each of the plurality of sections performs a different cleaning purpose, one of the plurality of sections including a wet area, and wherein the cleaning liquid is directed through the inlet tunnel and into the wet area, the lens shield is at least partially wetted by the wet area during rotation of the lens shield and thereby the lens shield is at least partially cleaned by the cleaning liquid;

a main squeegee located behind the blade, the main squeegee configured to remove said debris from the lens shield, said debris removed by the main squeegee is directed through the drainage tunnel and out through the drainage aperture;

a second squeegee located behind the raised lip, the second squeegee configured to remove said remaining debris from the lens shield, the second squeegee further configured to remove remaining cleaning liquid from the lens shield, the remaining cleaning liquid being directed through the debris passageway and into the wet area for recirculation;

a seal element configured for attachment about a power input port of the camera, the seal element configured to prevent debris and debris from entering the power input port; and a power supply system for supplying power to the lens cleaning system.

16. A method of automatically cleaning a lens of a camera, the lens including an optical axis defining a light path, the method comprising the steps of:

providing a lens cleaning system including:
a main case including an attachment means configured to attach the lens cleaning system to the camera, a bottom section, a top section sat atop the bottom section, and a shield housing disposed within the top section, the shield housing including a lens aperture in which the lens sits when the lens cleaning system is attached to the camera, the lens aperture sized at least substantially equal to the lens of the camera such that the light path of the lens is not obstructed, a lens shield seated within the shield housing, the lens shield seated atop the lens when the lens cleaning system is attached to the camera, the lens shield being transparent such that the light path passes through the lens shield unobscured, an actuator means attached to the lens shield such that the actuator means is able to rotate the lens shield relative to the optical axis, a cleaning member housing removably attached atop the lens shield, the cleaning member housing including a left side and a right side relative to the camera, the left side including a housing opening sized at least substantially equal to the lens of the camera such that the light path of the lens is not obstructed, the cleaning member housing including at least one debris director means and at least one debris outlet, at least one cleaning member seated within an interior side of the cleaning member housing, the at least one cleaning member configured to contact a top surface of the lens shield and clean debris therefrom, and a power supply system for supplying power to the lens cleaning system;

attaching the cleaning member housing to the main case;
attaching the main case to the camera via the attachment means;

supplying power to the lens cleaning system, thereby:
powering the actuator means, and
causing the actuator means to continuously rotate the lens shield relative to the optical axis, the lens shield continuously passing by the at least one cleaning member such that said debris is continuously cleaned from the lens shield prior to passing over the lens of the camera and therefore the lens is always substantially free from said debris.

17. The method of claim 16, further comprising the steps of:

providing the lens cleaning system wherein:
the at least one debris director means includes a raised lip located at a top exterior edge of the housing opening at an exterior side of the cleaning member housing and positioned at a top of the lens when the lens cleaning system is attached to the camera, and wherein the raised lip is configured to direct said debris away from the lens, the at least one debris director means further includes a blade located on a side edge of the housing opening at the exterior side of the cleaning member housing and positioned at a side of the lens when the lens cleaning system is attached to the camera, and wherein the blade is configured to scrape said debris from the lens shield, the at least one debris outlet includes a drainage tunnel and a drainage aperture located on the interior side of the cleaning member housing, the at least one cleaning member includes a cleaning wipe, wherein the cleaning wipe is split into a plurality of sections, and wherein each of the plurality of sections performs a different cleaning purpose, the at least one cleaning member further includes a main squeegee located behind the blade, and wherein the main squeegee is configured to remove said debris from the lens shield, and wherein said debris removed by the main squeegee is directed through the drainage tunnel and out through the drainage aperture, the at least one cleaning member further includes a second squeegee located behind the raised lip, and wherein the second squeegee is configured to remove remaining debris from the lens shield; and supplying power to the lens cleaning system, thereby:
powering the actuator means, and
causing the actuator means to continuously rotate the lens shield relative to the optical axis, the lens shield continuously passing by the main squeegee, the cleaning wipe, the second squeegee and the blade, the main squeegee removing said debris from the lens shield, the blade scraping said debris from the lens shield, the cleaning wipe cleaning said debris from the lens shield and the second squeegee removing said remaining debris from the lens shield prior to the lens shield passing over the lens, the raised lip directing said debris away from lens, said debris removed by the main squeegee directed through the drainage tunnel and out through the drainage aperture.

18. The method of claim 17, further comprising the steps of:

providing the lens cleaning system wherein:
one of the plurality of sections includes a wet area,
the at least one debris outlet further includes a debris passageway located on the interior side of the cleaning member housing,
the cleaning member housing further includes a liquid inlet, wherein the liquid inlet includes an inlet aperture attached to an inlet tunnel, wherein the liquid inlet is configured to receive cleaning liquid, and wherein the cleaning liquid is directed through the inlet tunnel and into the wet area, and inserting cleaning liquid into the liquid inlet, the cleaning liquid directed through the inlet tunnel and into the wet area; and supplying power to the lens cleaning system, thereby:

powering the actuator means, and causing the actuator means to continuously rotate the lens shield relative to the optical axis, the lens shield being at least partially wetted by the wet area during rotation of the lens shield and thereby the lens shield is at least partially cleaned by the cleaning liquid.

19. The method of claim 18, further comprising the steps of:

providing the lens cleaning system wherein:

the second squeegee is further configured to remove remaining cleaning liquid from the lens shield, and wherein the remaining cleaning liquid is directed through the debris passageway and into the wet area for recirculation; and supplying power to the lens cleaning system, thereby:

powering the actuator means, and causing the actuator means to continuously rotate the lens shield relative to the optical axis, the lens shield continuously passing by the main squeegee, the cleaning wipe, the second squeegee and the blade, the second squeegee removing remaining cleaning liquid from the lens shield, the remaining cleaning liquid being directed through the debris passageway and into the wet area for recirculation.

\* \* \* \* \*